United States Patent [19]

Wright

[11] Patent Number: 4,667,713
[45] Date of Patent: May 26, 1987

[54] CHIPPER KNIFE ASSEMBLY

[75] Inventor: James L. Wright, Creswell, Oreg.

[73] Assignee: Weyerhaeuser Company, Tacoma, Wash.

[21] Appl. No.: 866,522

[22] Filed: May 23, 1986

[51] Int. Cl.$^4$ .............................................. B26D 1/12
[52] U.S. Cl. ................................... 144/231; 144/241; 144/374; 407/46; 407/49; 83/842
[58] Field of Search ............... 144/218, 231, 233, 235, 144/236, 241, 374; 407/41, 46, 49, 87, 90, 101; 82/36 A

[56] References Cited

U.S. PATENT DOCUMENTS

| | | | |
|---|---|---|---|
| 1,140,021 | 5/1915 | Brown | 83/842 |
| 1,356,682 | 10/1920 | Woodcook | 83/842 |
| 1,831,705 | 11/1931 | Freas | 83/842 |
| 2,117,147 | 5/1938 | Charlton | 83/842 |
| 3,091,474 | 5/1963 | Boutros et al. | 407/49 |
| 3,356,114 | 12/1967 | Noel | 144/172 |
| 3,884,281 | 5/1975 | Pease | 144/374 |
| 4,329,091 | 5/1982 | Erkfritz | 407/41 |
| 4,396,315 | 8/1983 | Middleton | 144/241 |
| 4,456,307 | 6/1984 | Merten et al. | 407/49 |
| 4,592,680 | 6/1986 | Lindsay | 407/49 |

Primary Examiner—W. D. Bray

[57] ABSTRACT

The present invention is a knife assembly for a chipping canter or a mechanically similar device. In its basic form it comprises four parts: a knife holder, a knife, a knife retaining pull down block, and a tapered draw bolt to tighten the assembly. The knife holder is constructed to engage a conventional seat in a chipper head segment. It has an arcuate front surface to receive the knife element. The knife element has a rib on its rear surface which has a dovetail or T-shaped flange. The pull down block is similarly configured with a female dovetail or T-slot to grasp the rib flange on the back of the knife holder. A tapered bolt is threaded into the knife holder and passes through a similarly tapered hole in the pull down block. As the bolt is screwed into the knife holder, the pull down block and encompassed knife element are drawn to the rear where they are tightly frictionally held against the knife holder. The knife element may have an adjusting screw which seats against an appropriate portion of the knife holder for controlling the cutting height of the knife. For maintenance it is not necessary to remove the knife holder from the chipper head segment. The knife may be removed by loosening the tapered bolt and sliding it out of the knife holder. The knife element may be simply sharpened by a conventional grinding wheel which need not be configured in any special manner. Repeated tests have shown that a knife element of the present assembly will have a life cycle approximately 30% longer than conventionally used one-piece knives.

12 Claims, 11 Drawing Figures

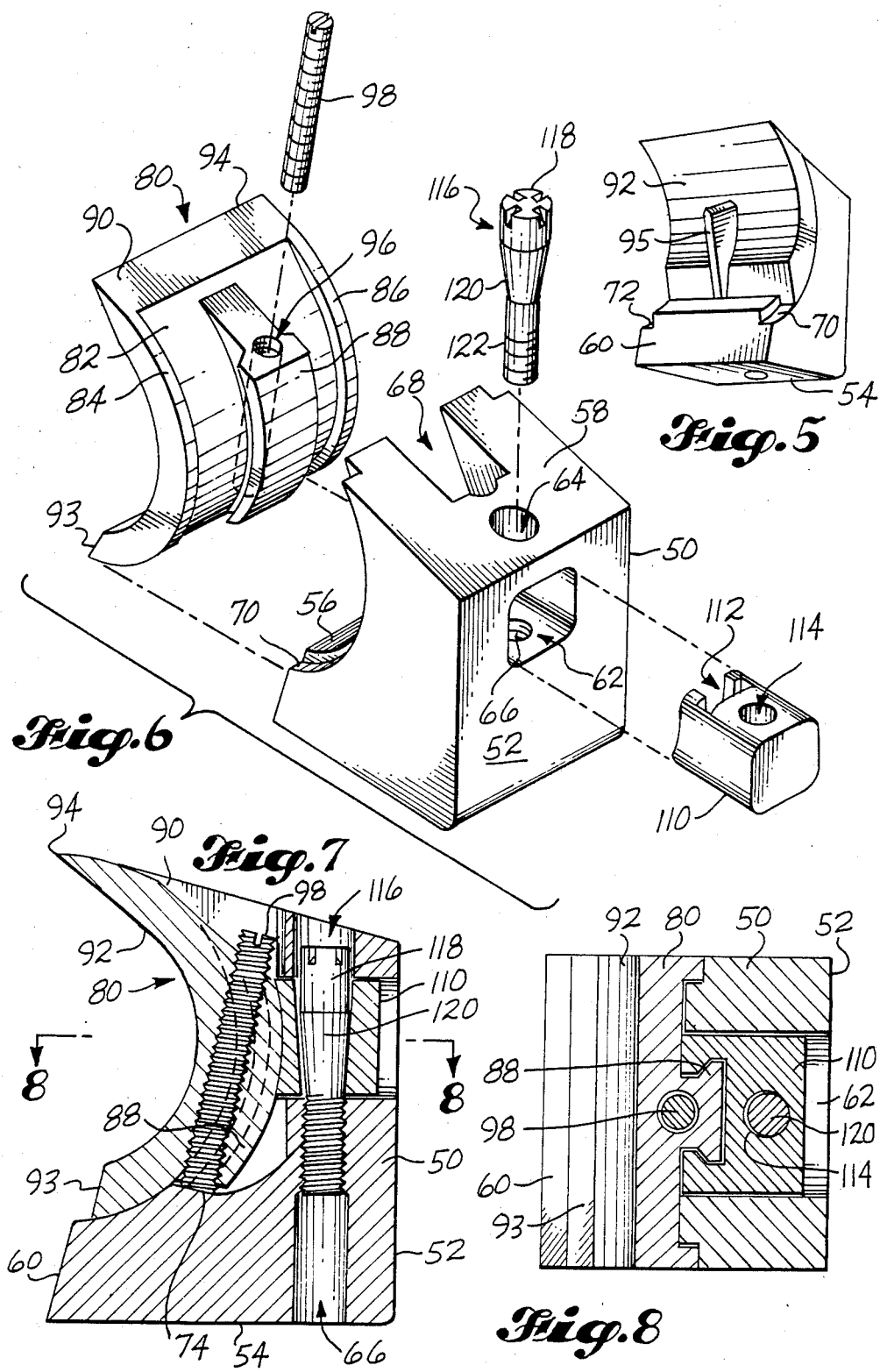

CHIPPER KNIFE ASSEMBLY

BACKGROUND OF THE INVENTION

The present invention comprises a knife assembly for a chipping canter or similar small log sawmill device which may be readily and simply removed for sharpening or repair. The knife assembly is especially well adapted for use on chipping canters having a plurality of knife retaining segments mounted on a common shaft so as to define a generally cylindrical chipper head when in operation.

At the present time, approximately half of the sawlogs in the United States and Canada are processed through primary breakdown devices including a chipper as an integral part. These chippers create flat faces on one or more sides of the log to simplify downstream processing. The portions of the log that would formerly have been removed as slabs are thereby converted into salable pulp chips. Such devices are frequently called "canters" since the log is usually configured by the chippers so that it is converted into one or more cants of predetermined dimensions after subsequent primary sawing. A "cant" is a sawn or otherwise processed piece of wood of rectangular cross section intended for further processing into boards or dimension lumber.

The most popular chipping canters are configured to have a plurality of individual segments stacked one upon the other on a common shaft. Each segment normally has two replaceable peripheral cutter knives. Adjacent heads on a given shaft are normally rotated so that the cutter knives are displaced by 90°. Knives are retained in notches on the periphery of the segment by a heavy dog or gib fastened with a single bolt.

One device using chippers of this type is sold as the Chip-N-Saw chipping canter/primary log breakdown unit. Chip-N-Saw is a registered trademark of Kockums Cancar, a Hawker Siddeley company of Vancouver, B.C.

The knives of a chipping canter of the type described above have a cutting edge approximately 50 mm in length and are made of a single piece of steel. The top to bottom dimension of these knives changes as they are ground for sharpening. In order to compensate for this, before replacement on the machine they are placed in a jig and a babbit shim is poured adjacent the base. In this manner a constant cutting radius can be maintained. In some positions on a typical installation, the knives are routinely replaced as frequently as every four hours. Depending on the maximum log size to be processed through the machinery, from 20 to 50 chipper segments employing twice this many knives are used. Knife replacement and maintenance forms a major item of operating expense. Before grinding for resharpening the babbit must be stripped from the base. A number of knives are placed side by side in a jig and shimmed or otherwise adjusted to bring the edges to a common height. Then a contoured grinding wheel traverses the knives to resharpen them. Each individual knife must then be removed and rebabbited before it can again be installed on the machine. The grinding wheels themselves represent a significant expense. Their life is relatively short since they must frequently be dressed to maintain a precise and complex edge configuration.

Others have in the past looked at chipping canters with an object of simplifying knife maintenance. One such effort is described in U.S. Pat. No. 3,356,114 to Noel. Here the knife is a simple arcuate or crescentic-shaped blade which extends the full length of an elongated cylindrical chipper head. This blade is frictionally held in place in an arcuate seat on the chipper head by a dog-and-jib arrangement. Normally the base will be babbited or otherwise shimmed to ensure a constant cutting radius.

Other than the above arrangement, little attention appears to have been given for simplifying and reducing the cost of chipper blade maintenance. The technology that has long been available for installing replaceable teeth in circular saws appears not to have been adapable on a practical basis to chipper heads. In the most common arrangement for sawteeth, arcuate cutouts are made in the periphery of a sawplate. These cutouts, which are typically about 180° to 270° of a circle, are formed with a male V-shaped keel over most or all of their length. A crescentic-shaped locking segment having a corresponding V-groove is used in the arcuate cutout to hold a separate tooth in place. The following United States patents are representative of some of the earlier variations in this generic concept: Woodcock, U.S. Pat. No. 1,356,682; Brown, U.S. Pat No. 1,140,021; Freas, U.S. Pat. No. 1,831,705; and Charlton, U.S. Pat. No. 2,117,147. These and many subsequent similar patents are primarily directed to minor variations in tooth configuration to ensure tightness and stability during operation.

There has been a long felt need within the sawmilling industry for a chipping canter knife which would have longer life and could be more simply, economically, and rapidly maintained. These needs have now been filled by the knife assembly of the present invention.

SUMMARY OF THE INVENTION

The present invention is a knife assembly for a chipping canter or similar device. The assembly has a knife holder which is mountable on the chipper head segment in similar fashion to the prior art chipper knife. An adjustable and replaceable knife is seated on the holder. The knife has a flanged dovetail or T-shaped rib on the rear surface which is engaged by a pull down block mounted in the knife holder. A tapered drawbolt mounted in the knife holder and passing through the pull down block is used for tightening the knife in the assembly.

The knife holder has basal and rear surfaces which are angularly disposed with regard to each other for engaging a conventional seat in a chipper head segment. Most typically these surfaces define planes lying normal to each other. The knife holder further has a concave arcuately-shaped front surface for receiving the chipper knife. A front-to-rear aperture or opening is machined to receive the slidable pull down block. Clearances between the pull down block and the knife holder are such that the block can slide freely without undue sloppiness.

The knife portion of the assembly has a convex arcuately-shaped rear surface which corresponds in radius to the concave front surface of the knife holder. When not engaged by the pull down block, the knife can slide freely on the front face of the knife holder. Each knife has an arcuate elongated flanged rib running along the top-to-bottom centerline on the rear surface. Usually the flange portion will be of dovetail or T-shaped configuration. The knife holder has an appropriately located groove to freely receive the rib. The flanged portion of the rib engages an appropriately configured portion at the forward end of the pull down block. The pull down block further has a tapered opening either from side to side or top to bottom configured to receive the tapered bolt. The top to bottom orientation is the preferred one. It is also preferred that the T-shaped or dovetail rib portion on the back of the knife be of male configuration with a corresponding female slot on the front of the drawbolt. However, an assembly made with the reverse configuration is fully operable and should be considered to be within the scope of the invention.

The assembly is completed by the tapered drawbolt which passes through the pull down block and is threaded into the knife holder. When the drawbolt is tightened, its tapered portion contacts the rear surface of the tapered opening and serves to move the pull down block and knife rearwardly. In this manner the knife is frictionally tightened against the knife holder. By loosening the drawbolt one or two turns, the knife can be readily slid out of the holder and pull down block for sharpening or replacement without the need for removing the knife holder from the chipper head.

The rib portion on the rear surface of the knife is preferably oriented along an arcuate line normal to the cutting edge. In the preferred configuration, the tapered drawbolt is oriented along an axis which when projected is also normal to the cutting edge of the knife and is essentially parallel to the plane defining the rear surface of the knife holder.

An important feature of the invention is the provision of an adjusting screw on the knife so that its cutting edge can be quickly adjusted to the proper cutting radius. This adjusting screw typically passes from top to bottom through the rib and is parallel to the projected centerline of the rib. A corresponding portion on the knife holder acts as a seat or a stop for the adjusting screw. The adjusting screw may be preset prior to grinding a dull knife to control the amount of metal removed and to enable the knife to be replaced in the holder without the need for gauges or other devices to ensure that the cutting edge is the proper radial distance from the center of the chipper head shaft.

It is an object of the present invention to provide a knife assembly for a chipping canter or similar device which has a rapidly and easily adjustable chipper knife.

It is another object to provide a knife assembly for a chipping canter in which a separate knife portion can be made of a hard or otherwise metallurgically desirable alloy.

It is a further object of the invention to provide a knife assembly for a chipping canter in which the knife holder need not be removed from the chipper head segment at the time of knife replacement.

It is yet another object to provide a knife assembly for a chipping canter which does not need to be rebabbited at the time of knife replacement.

These and many other objects will become clear and readily apparent to those skilled in the art upon reading the following detailed description taken in conjunction with the drawings.

BRIEF DESCRIPTION OF THE DRAWINGS.

FIG. 5 is a view similar to FIG. 3 showing a modified knife with a medially inserted chip breaker.

FIG. 6 is an exploded perspective view of the present knife assembly seen from above the left rear corner.

FIG. 7 is a side elevation, partially in section, of the present knife assembly.

FIG. 8 is a top plan view, partially in section, along line 8—8 of FIG. 7.

DESCRIPTION OF THE PREFERRED EMBODIMENTS

Figure 1:
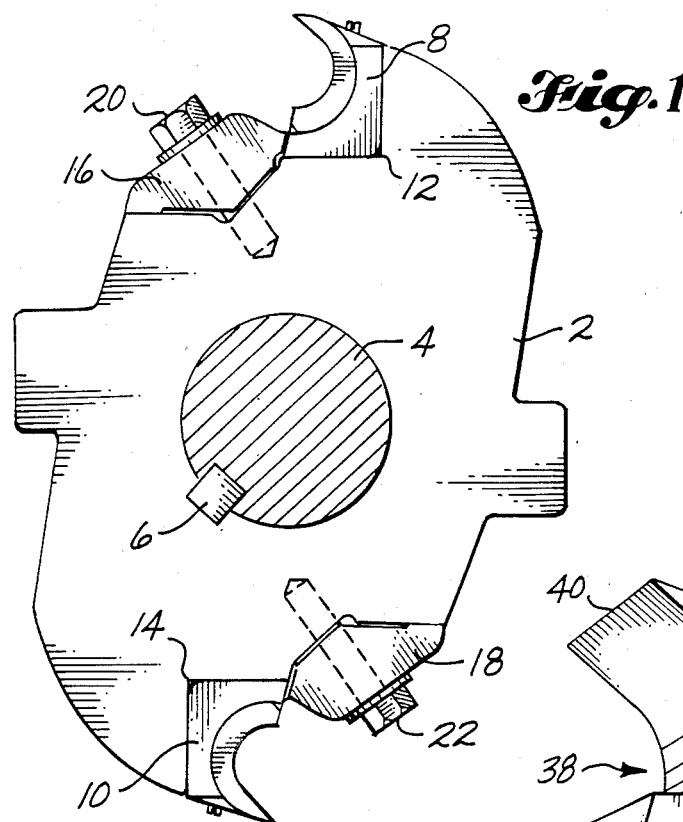
FIG. 1 is a side elevation view of a chipper head typical of those used on chipping canters.

The construction and operation of the present chipper knife assembly can be better appreciated with an understanding of how prior art chipper knives are used and maintained. FIG. 1 shows a chipper head segment 2 mounted on a heavy steel shaft 4 and maintained in position by key 6. In a normal installation, several such heads would be stacked on shaft 4 although each would be rotated 90° with respect to any adjacent heads. A pair of knives 8, 10 are mounted in knife seats 12, 14 machined into the head. The knives shown here are the knife assemblies of the present invention. Each knife assembly is held tightly in place in the seat by dogs 16, 18 which are held in position by bolts 20, 22.

Figure 2:
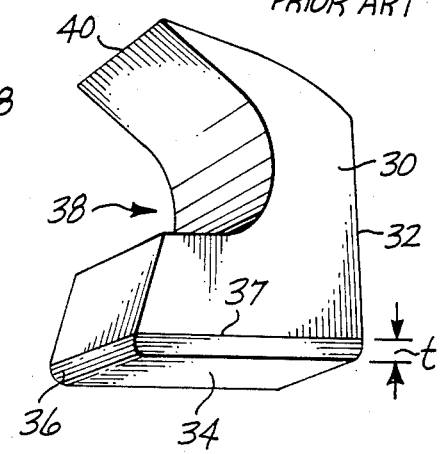
FIG. 2 shows a perspective view of a prior art knife for the above chipper head.

FIG. 2 shows a very widely used type of solid steel cutter knife 30. This knife has a back or rear surface 32 and a basal surface 34. Both of these surfaces are essentially planar in configuration and are oriented 90° to each other. Basal surface 34 is formed on a babbit shim 36 which is cast to the actual base 37 of the steel cutter knife. The knives have a gullet 38 formed on the front surface which terminates at the top in cutting edge 40.

The construction of the knife of the present invention can be understood by reference to FIGS. 3-9 where like numbers indicate like parts throughout. A steel knife holder 50 has a rear surface 52, a basal surface 54, a front surface 56 (FIG. 6), and an upper surface 58. A buttress 60 on the lower front portion of the knife holder serves to bear against dog 16 to firmly lock the assembly in position on the cutterhead. The knife holder further has a pull down block aperture 62 whose longitudinal axis is generally normal to rear surface 52. A tapered bolt aperture 64 lies on an axis normal to the longitudinal axis of the pull down block aperture. The upper portion 64 is designed to pass the head of a tapered bolt 116. A lower portion 66, below the pull down block aperture, accepts the threaded portion of the tapered pull down bolt.

The front face of the knife holder has an arcuate slot 68 provided to accommodate a dovetail-shaped rib on the back of the cutting element. This slot is configured to hold, but not to engage, the dovetail portion of the rib. A pair of step-like aligning surfaces 70, 72 are located along each edge of the front surface. These receive equivalent aligning ridges on the back of the knife element. This feature is shown here as a rabbet construction but under some circumstances a dovetail arrangement would be suitable or might even be preferable. An adjusting screw seat 74 (FIG. 7) is the final feature of the knife holder. The knife holder may have a longitudinal slot formed in the base or a vertical slot in the back, neither being shown in the drawings, for engaging a corresponding position orienting key or rib located on the chipper head.

The knife itself is shown generally at 80. It has a rear surface 82 with aligning ridges 84, 86 along the edges. The flanged dovetail or T-shaped rib 88 extends from top to bottom in an arcuate path along a portion of the rear surface. An upper surface 90 ultimately intersects the upper portion of the front surface 92 to form a cutting edge 94. A lower edge 93 on the front surface may be configured along a projection of locking buttress 60 on the knife holder. Alternatively a chip splitter 95 (FIG. 5) may be used on the front face.

An important aspect of the invention is the provision of an adjusting screw 98 located in threaded aperture 96 in the rib portion of the knife element. This adjusting screw is preferably of a commercially available type that will be resistant to displacement by vibration or other forces. As shown in FIG. 7, the adjusting screw serves to locate the radial distance of cutting edge 94 from the center of shaft 4. This adjusting screw normally will be preset before a new knife is installed in the knife holder.

The knife is held in place in the knife holder by a pull down block 110 which is configured to have a sliding fit in corresponding aperture 62. The front portion of the knife holder has a T-shaped or dovetail slot 112 which is sized to engage the corresonding male flange 88 located on the back of the knife element. A vertically oriented bore hole 114, tapered from top to bottom at approximately a 5° angle, is placed through the pull down block parallel to the projected axis of rib 88.

Figure 4:
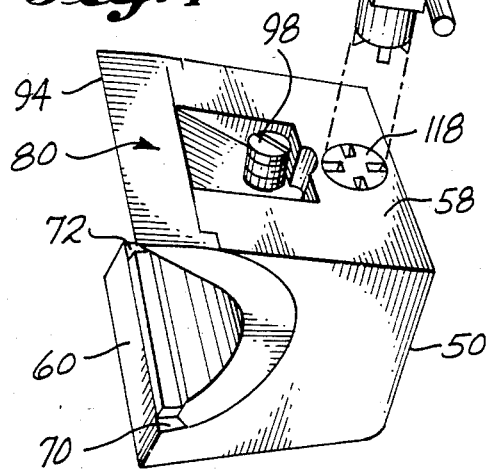
FIG. 4 is a perspective view of the present knife assembly as seen from a vantage point above and to one side.
Figure 3:
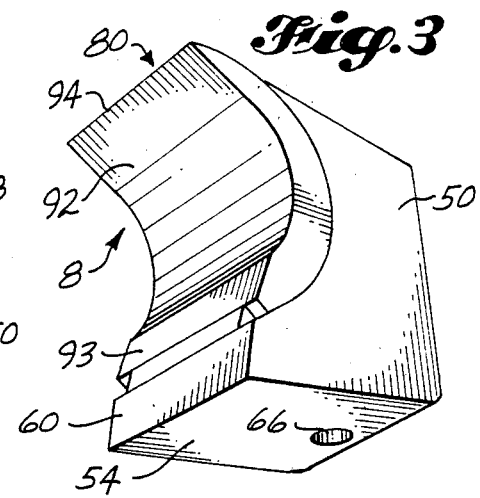
FIG. 3 is a perspective view of the knife assembly of the present invention as seen from a viewpoint below a front corner.

The knife assembly is completed by tapered bolt 116. This has a generally cylindrical head portion 118 which may be slotted in any fashion for receiving a driving tool 130 (FIG. 4). Below the head portion is a tapered portion 120 which is also configured at approximately a 5° angle. The tapered bolt terminates in a conventional threaded portion 122 which fits into tapped opening 66 in the knife holder.

As is best seen in FIGS. 7 and 8, the tapered bore hole 114 in the pull down block is configured with respect to slot 112 so that the tapered portion 120 of the tapered bolt engages the rear surface of the bore hole when the assembly is tightened. As bolt 116 is turned further down into the knife holder, the pull down block and knife are drawn slightly to the rear to firmly tighten the entire assembly.

Figure 9:
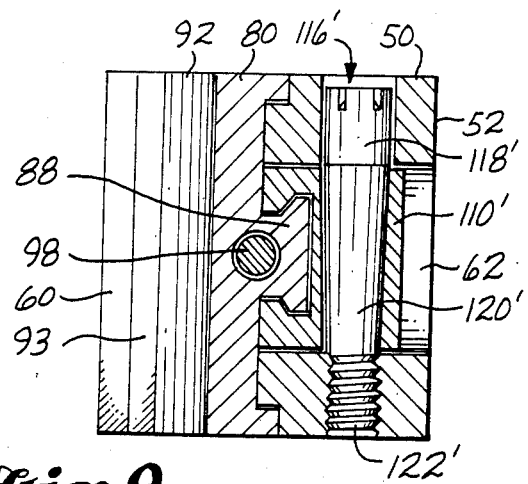
FIG. 9 is a view similar to FIG. 8 showing an alternative construction.

An alternative construction is shown in FIG. 9. Here the tapered bolt 116' is oriented transversely through the knife holder and pull down block 110'. This construction is the full mechanical equivalent of the version shown in FIGS. 3–8 and its use is a matter of individual preference.

A number of advantages of the present knife assembly construction should now be apparent to those skilled in the art. It is evident that the knife and knife holders may be made of different types of steel so that better advantage can be taken of the many alloys now available. As one example, the knife element itself could be made from a hard tool steel without unduly increasing the cost while the knife holder is made of a different alloy selected to withstand the peculiar stresses to which it is subjected. Further, due to the simple construction of the knife employing the adjustment screw, there is no need for rebabbiting the knife holder each time a knife is removed for sharpening. The knife holder remains on the cutter head segment and a preadjusted knife is simply slid into the assembly and quickly tightened in place by the tapered bolt. There is a further advantage here since there is no need for transverse adjustment of the knives on the chipper head segments each time a knife is changed.

Figure 10:
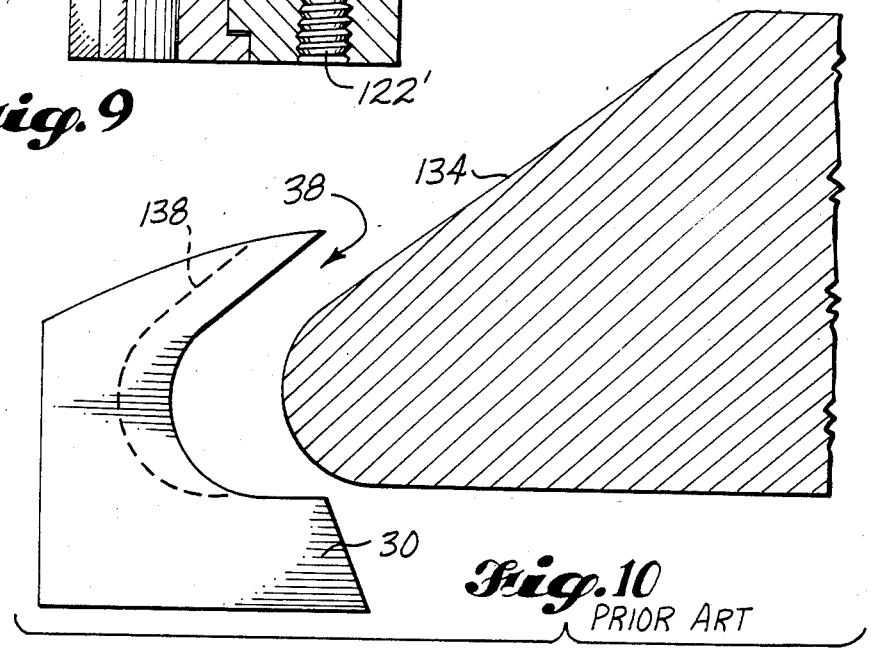
FIG. 10 is a side elevation, partially in section, showing how prior art knives are ground for resharpening.
Figure 11:
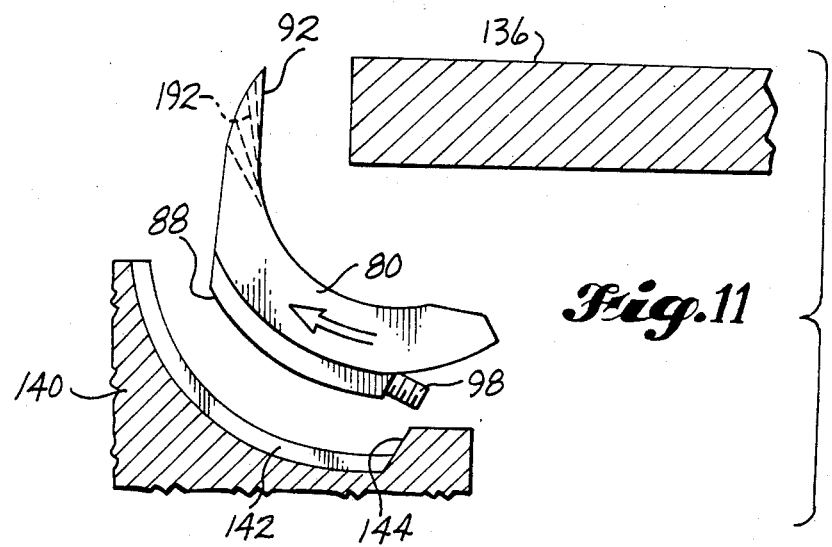
FIG. 11 is a view, similar to FIG. 9, showing the grinding procedure for knife elements of the present invention.

Another advantage is not as readily apparent as those described above. This relates to the ease and simplicity of sharpening a dull knife. By virtue of its configuration and the manner in which it is resharpened, the knife element of the present invention will typically have a 30% longer life span than an old style knife. The reasons for this are seen in FIGS. 10 and 11. In a conventional one-piece steel knife 30 the entire gullet area 38 is ground out by a contoured grinding wheel 134. In normal practice a group of these knives which are worn to approximately the same degree will be clamped side by side in a jig and the grinding wheel traversed along the length of the assembled units. The grinding wheels must be frequently dressed to retain the proper configuration of the edge area. This is normally done by hand and gives a gullet configuration which is at best an approximation of the one desired. By the time the gullet is ground back beyond the point shown by dashed line 138 the knife is no longer usable and must be discarded. It is evident that this procedure results in the removal of considerable metal at each sharpening.

FIG. 11 shows the manner in which the knives of the present invention are ground. The knife element 80 is placed in a jig 140 having a recess 142 to receive rib 88. The base of the jig has a stop 144 against which adjusting screw 98 is brought to bear. A conventionally configured grinding wheel 136 is used for sharpening. As the knife is ground back to new surfaces 192, the adjustment screw 98 is further extended to move the knife element arcuately upward in the jig. With this procedure, wheel dressing may be done simply and with great accuracy. Only a minimal amount of metal is removed from the knife element during each sharpening cycle.

It will be evident to those skilled in the art that many variations can be made in the knife assembly heretofore disclosed without departing in any way from the spirit of the invention. Variations which are simply mechanical modifications of the structures disclosed are considered to be encompassed within the following claims.

I claim:

1. A knife assembly for a chipping canter or similar device which comprises a knife holder means, an adjustable and replaceable chipper knife means seated on said holder, a knife retaining pull down block means mounted in the knife holder means, and a tapered draw bolt means mounted in the knife holder means and passing through the pull down block means for tightening the knife means in the assembly;

the knife holder having basal and rear surfaces angularly disposed with regard to each other for engaging a seat in a chipper head, a concave arcuately shaped front surface for receiving the chipper knife, and an upper surface, said knife holder being apertured from front to rear to slideably receive the knife retaining pull down block;

the knife having a convex arcuately shaped rear surface corresponding in radius to the concave front surface of the knife holder so as to closely slidingly engage said knife holder, the rear surface of the knife further having an elongate flanged rib portion for engaging the pull down block, said knife having front and upper surfaces intersecting to form a cutting edge;

the pull down block having a corresponding forwardly disposed configuration to receive and grasp the flanged pull down block engaging rib portion on the rear surface of the knife; and the tapered draw bolt being threaded into the knife holder and passing through the pull down block so that when said draw bolt is tightened it serves to draw the pull down block and knife rearwardly and the knife is frictionally tightened against the knife holder.

2. The knife assembly of claim 1 in which the rib portion on the rear surface of the knife is oriented along an arcuate line normal to the cutting edge.

3. The knife assembly of claim 1 in which the knife holder has an opening for the tapered draw bolt oriented from top-to-bottom and entering the upper surface of the knife holder.

4. The knife assembly of claim 1 in which the knife holder has an opening for the tapered draw belt oriented from side-to-side.

5. The knife assembly of claim 3 in which the tapered draw bolt is oriented along an axis the projection of which is normal to the cutting edge of the knife and essentially parallel to the rear surface of the knife holder.

6. The knife assembly of claim 4 in which the tapered draw bolt is oriented along an axis parallel to the cutting edge of the knife and essentially parallel to the rear surface of the knife holder.

7. The knife assembly of claim 3 in which the pull down block has a tapered bore hole corresponding to the taper angle of the draw bolt.

8. The knife assembly of claim 4 in which the pull down block has a tapered bore hole corresponding to the taper angle of the draw bolt.

9. The knife assembly of claim 1 in which the knife has an adjusting screw oriented parallel to the projected centerline of the rib and passing through said rib.

10. The knife assembly of claim 9 in which the knife holder has a seat acting as a stop for the adjusting screw.

11. The knife assembly of claim 2 in which the rib portion flange has a male dovetail or T-shaped configuration and the pull down block has a corresponding female configuration.

12. The knife assembly of claim 1 in which the knife has marginal aligning ridges along each longitudinal edge and the knife holder has corresponding step-like marginal aligning surfaces along the edges of the front surface.

* * * * *